United States Patent [19]

Parruck et al.

[11] Patent Number: 4,799,144
[45] Date of Patent: Jan. 17, 1989

[54] MULTI-FUNCTION COMMUNICATION BOARD FOR EXPANDING THE VERSATILITY OF A COMPUTER

[75] Inventors: Bidyut Parruck, Hamden; Hoshang D. Mulla, Trumbull, both of Conn.

[73] Assignee: Alcatel USA, Corp., New York, N.Y.

[21] Appl. No.: 659,989

[22] Filed: Oct. 12, 1984

[51] Int. Cl.⁴ .............................................. G06F 3/16
[52] U.S. Cl. .................................... 364/200; 379/284
[58] Field of Search ... 364/200 MS File, 900 MS File; 381/36–40; 340/825.19; 179/6.08, 6.06, 18 BC, 18 G; 379/88, 89, 96, 284, 97

[56] References Cited

U.S. PATENT DOCUMENTS

| | | | |
|---|---|---|---|
| 3,706,929 | 12/1972 | Robinson | 381/38 |
| 4,215,240 | 7/1980 | Ostrowski | 340/825.19 |
| 4,327,251 | 4/1982 | Fomenko | 179/6.08 |
| 4,441,200 | 4/1984 | Fette | 381/36 |
| 4,460,806 | 7/1984 | Caniff et al. | 379/284 |
| 4,489,438 | 12/1984 | Hughes | 379/89 |
| 4,547,630 | 10/1985 | Giammarrusco | 379/89 |
| 4,627,046 | 12/1986 | Bellamy | 379/94 X |
| 4,640,989 | 2/1987 | Riner et al. | 379/96 X |
| 4,650,927 | 3/1987 | James | 379/88 X |
| 4,659,877 | 4/1987 | Dorsey et al. | 379/96 X |
| 4,675,840 | 6/1987 | Raymond et al. | 364/200 |
| 4,704,730 | 11/1987 | Turner et al. | 381/36 |

OTHER PUBLICATIONS

W. L. Rush, "The Abilityphone", Byte, Sep. 1982, vol. 7, No. 9, pp. 240–246.
Anita Seelig, "Now Let Your Computer Reach Out", Computers & Electronics, Apr. 1984, pp. 57–59, 109–112.

Primary Examiner—Raulfe B. Zache
Assistant Examiner—Florin Munteanu
Attorney, Agent, or Firm—Peter C. Van Der Sluys

[57] ABSTRACT

A single board multiple option card for expanding the versatility of a host computer includes an onboard microprocessor, a digital signal processor and a switched memory device. The switched memory is accessible by the onboard microprocessor and the digital signal processor under the control of the onboard microprocessor. The card further includes an analog signal interface having a plurality of switches, the positions of which are controlled by the onboard microprocessor. As a result, multiple options are provided by varying the positions of the switches. Typically, such options may include: "Invisible Keyboard"; "Voice Command Over Telephone Lines"; "Voice Store and Forward Over the Telephone"; "Voice Record and Playback"; and "Hands-free Telephone".

23 Claims, 6 Drawing Sheets

MULTI-FUNCTION COMMUNICATION BOARD FOR EXPANDING THE VERSATILITY OF A COMPUTER

CROSS-REFERENCE TO RELATED APPLICATIONS

This application is related to one, or more, of the following U.S. patent applications: Ser. No. 670,436 filed Nov. 9, 1984; Ser. No. 670,521 filed on Nov. 9, 1984. All of the above applications are assigned to the assignee hereof.

BACKGROUND OF THE INVENTION

The present invention generally relates to an option card for expanding the versatility of a computer and, in particular, relates to such a card that provides multiple options and is implemented on a single printed circuit board.

With the expansion of the use of computers for a multitude of diverse tasks, many specific definable capabilities are being defined and demanded by computer users oriented towards specific goals. For instance, with the present and anticipated continued advancement in both the telecommunication and speed processing fields, a clear demand is emerging for various computer options integrating these fields. Such options include telephone management, voice controlled computer command, speech processing and many others.

Presently, a number of such options are available individually. Generally, however, the voice/telecommunciation options require two or more printed circuit boards or, if implemented on a single board, have rather limited versatility the usefulness. Consequently, in order to serve the increasing demands for a plurality of options, suppliers must either expand the ability of the computers to accept a larger number of such boards or to provide multiple options on a single board. Clearly, the first alternative is quite expensive and complex, particularly when multiple options are to be provided for relatively physically small personal computers.

SUMMARY OF INVENTION

Accordingly, it is one object of the present invention to provide a multiple option card for expanding the versatility of a computer which multiple option card is implemented on a single printed circuit board.

This object is accomplished at least in part by a single printed circuit board having an analog signal interface including a plurality of switches configurable to execute and provide a plurality of different functions.

Other objects and advantages will become apparent to those skilled in the art from the following detailed description read in conjunction with the appended claims and the drawings attached hereto.

DETAILED DESCRIPTION OF THE INVENTION

Figure 1:
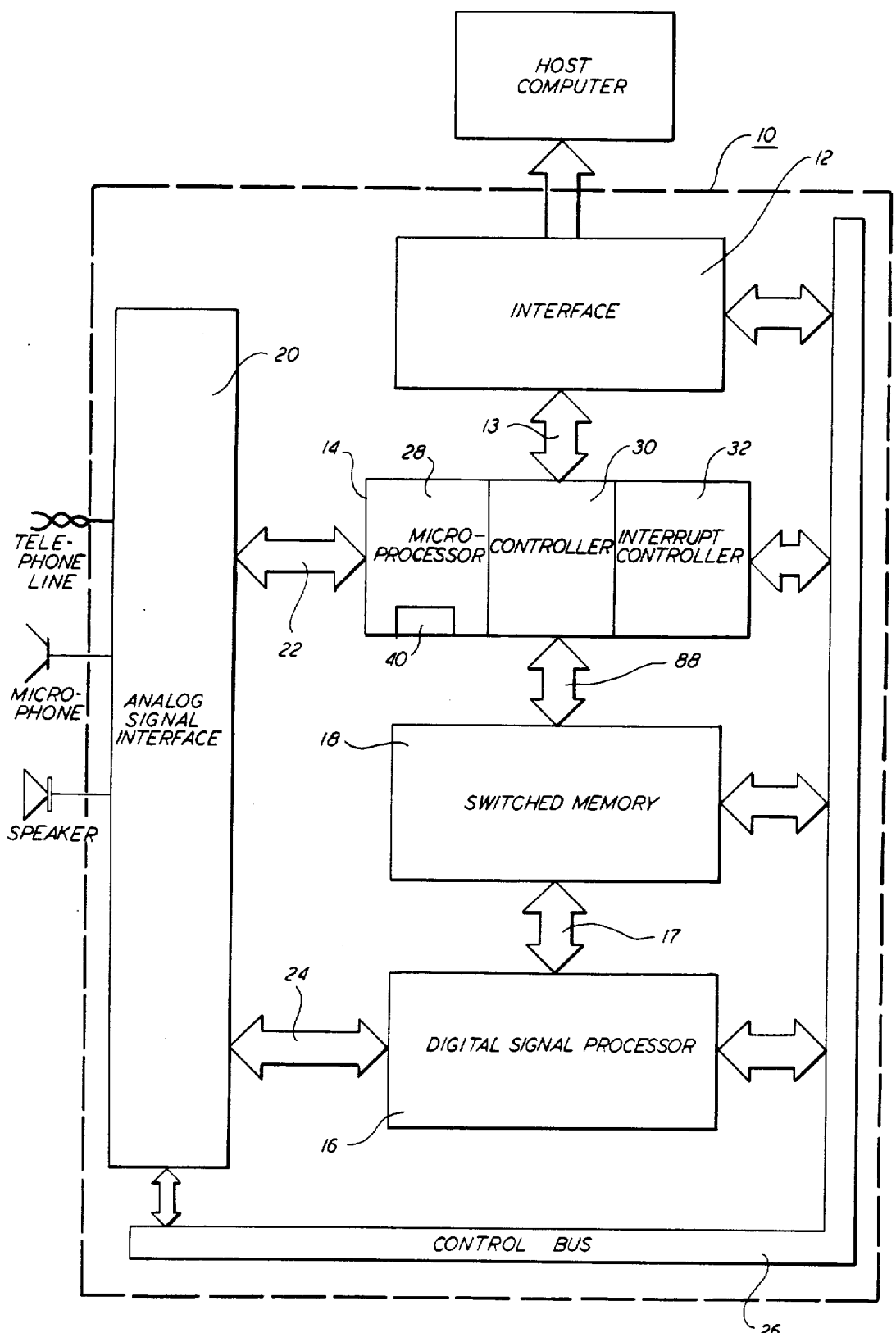
FIG. 1 is a block diagram of a multiple option card incorporating the principles of the present invention.

A single board multiple option card for use with computers, generally indicated at 10 in FIG. 1 and embodying the principles of the present invention, includes a means 12 for interfacing with a computer, an onboard microprocessor 14 communicating with the means 12 for interfacing with the computer, via a bus 13, to establish communication between the mother board processor (not shown in the drawings) within the computer and the card 10. The card 10 further includes a digital signal processor 16 having a memory portion therein and a switched memory 18 shared by the onboard microprocessor 14 and the digital signal processor 16 under the control of the onboard microprocessor 14. In addition, the card 10 includes a means 20 for interfacing with analog signals as well as a first bus interface 22 establishes communication between the means 20 and the onboard microprocessor 14 and a second bus interface 24 is provided for communication between the means 20 and the digital signal processor 16. A control bus 26 is provided and intercommunicates with the interface means 12, the onboard microprocessor 14, the switched memory 18, the digital signal processor 16 and the analog signal interface means 20 and thus establishes a communication medium via which information is exchanged with the computer.

The computer interface means 12 is of the conventional design compatible with the host computer. The interface means 12 provides and establishes a communication mechanism between the onboard microprocessor 14 and the mother board microprocessor within the computer. In the preferred embodiment, the interface means 12 is conventional and provides means for polling the input/output ports thereto as well as a means for conveying interrupt messages between the mother board microprocessor and the onboard microprocessor 14. The interface means 12 is adapted to ensure that the mother board microprocessor within the host computer exercises full control, i.e., either by resetting, stopping or running, over the onboard microprocessor 14.

The onboard microprocessor 14 is also of a conventional type and, although functionally similar devices can also be used, includes, in the preferred embodiment, an INTEL 8088 microprocessor 28 having 128K bytes of dynamic random access memory (RAM), a dynamic memory controller element 30, preferably an INTEL 8208, 8K bytes of read only memory (ROM) and an interrupt controller 32, preferably an INTEL 8259A. The microprocessor 28, the dynamic memory controller element 30 and the interrupt controller 32 are products manufactured and marketed by INTEL Corp. of Santa Clara, CA. The onboard microprocessor 14 is conventionally arranged and, consequently, further detailed description thereof is deemed unnecessary herein.

Figure 6:
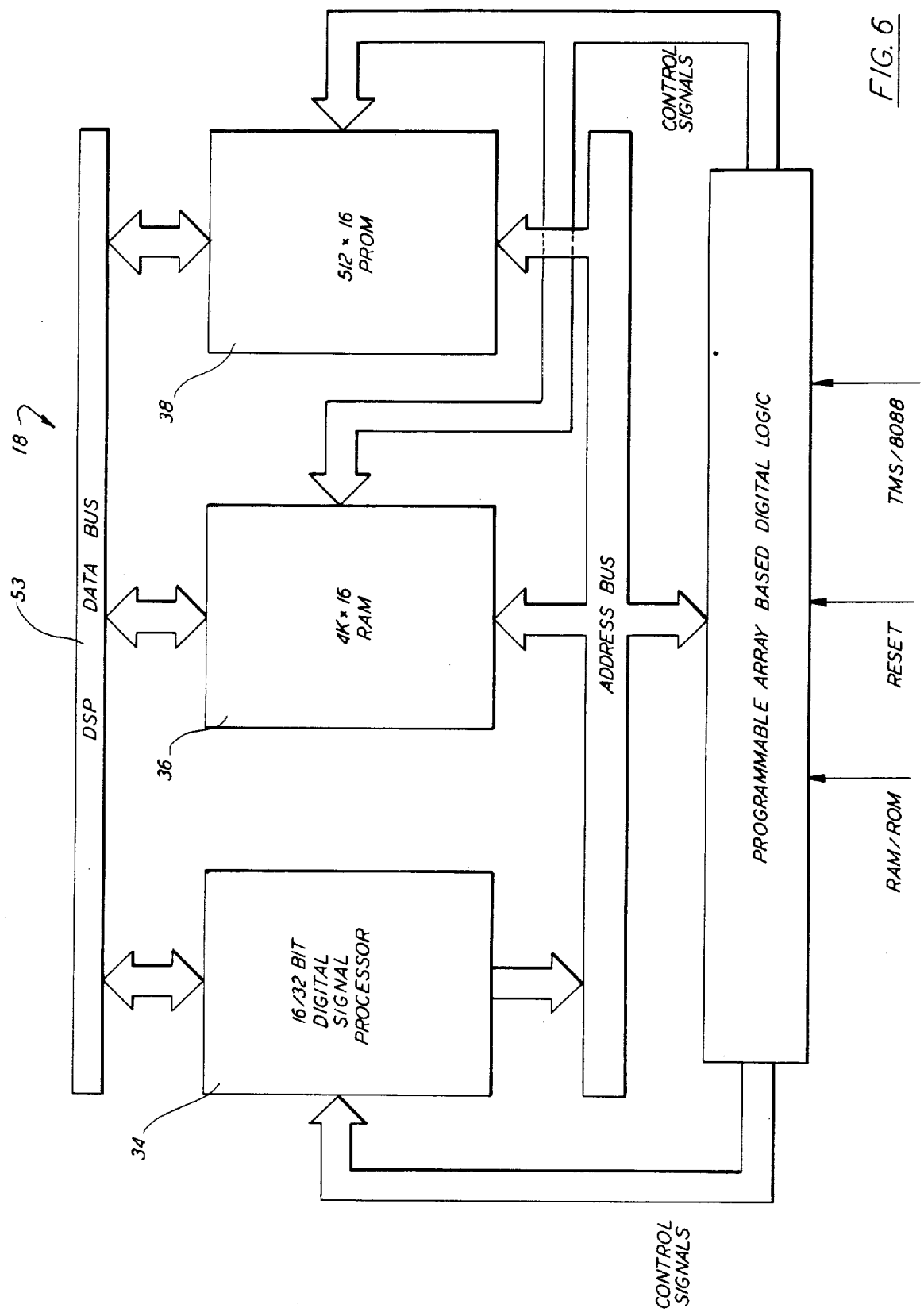
FIG. 6 is a block diagram of one embodiment of the digital signal processor shown in FIG. 1.

The digital signal processor 16, shown in more detail in FIG. 6, can be implemented by means of a 16/32-bit digital signal processor 34, for example, a TMS 32010, a device manufactured and marketed by Texas Instrument Corporation of Dallas, Tex. This 34 provides signal processing capabilities although other functionally similar devices may also be used. In the preferred embodiment, the digital signal processor 16 further includes a 4K word external program random access memory (RAM)36 and a 516 word external programmed read only memory (PROM) 38. Uniquely, both the RAM 36 and PROM 38 are mapped on the same address space and the onboard microprocessor 14, by means of a bit in a control register 40 thereof, switches therebetween to introduce the required memory. Furthermore, by means of that control register 40 the onboard microprocessor 14 controls the operation of the digital signal processor 16, i.e., by resetting, stopping or running. The digital signal processor 16 interfaces with the onboard microprocessor 14 by means of the switched memory 18 and interfaces with the analog signal interfacing means 20 by means of the bus 24. The switched memory 18 is accessed and controlled by the onboard microprocessor 14 having the digital signal processor 16 and has, effectively, one input/output port for both. Nevertheless, the switched memory 18 is such that only one of the two processors, 14 or 16, interface directly therewith at any given time and thus utilize the memory.

In general, the analog signal interface means 20 performs voice band analog-to-digital and digital-to-analog conversions thus providing communication between external analog devices and the digital signal processor 16. The analog signal interface means 20 is preferably adapted to encode and decode dual tone multi-frequency (DTMF) signals for the onboard microprocessor 14. In the preferred embodiment, the analog signal interface means 20 includes a means 44 for interfacing with a telephone line, a means 46 for interfacing with a microphone and a means 48 for interfacing with a speaker. The analog signal interface means 20 further includes a plurality of analog switches 50, the status of which is controlled by the onboard microprocessor 14.

Figure 2:
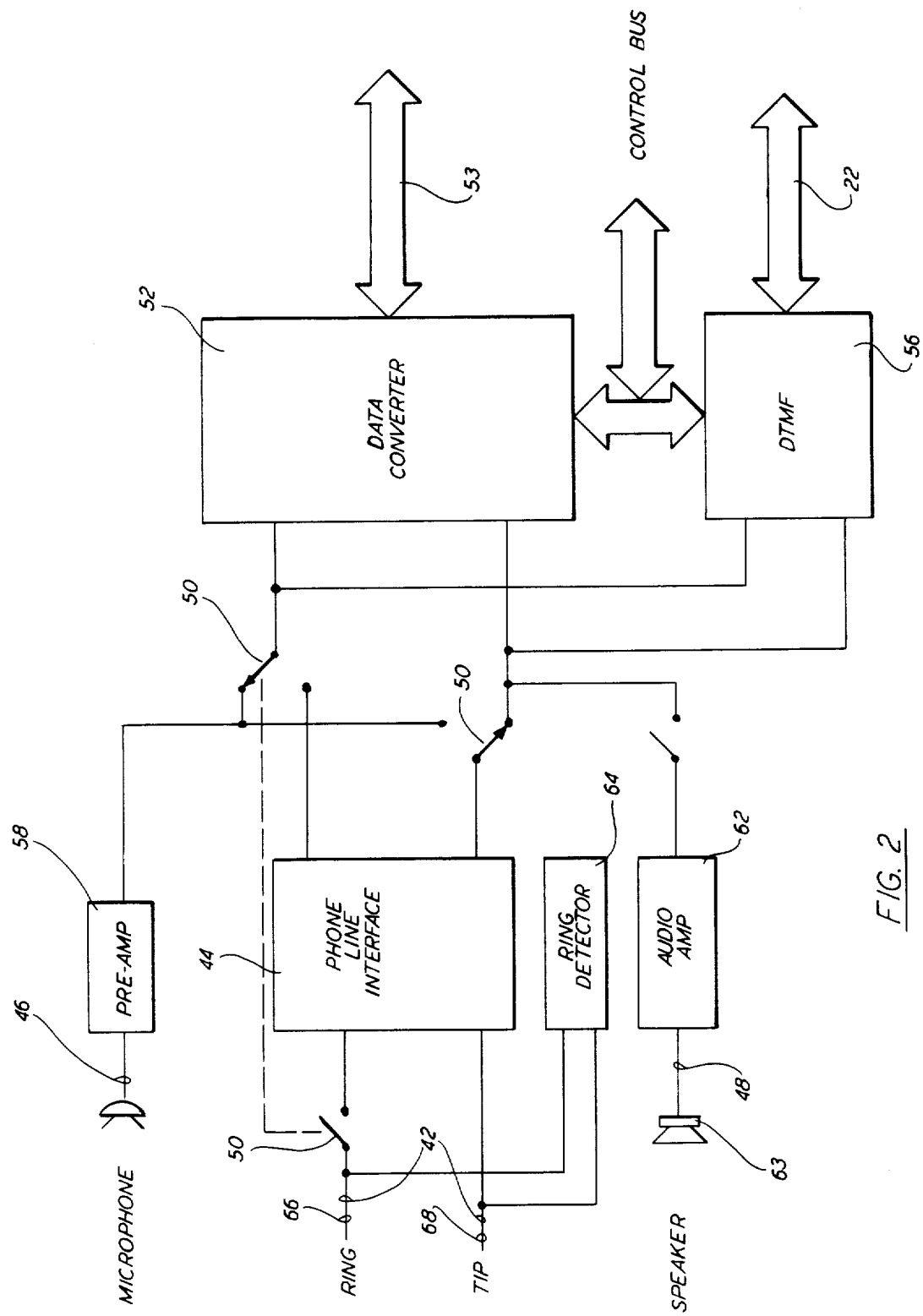
FIG. 2 is a block diagram of one embodiment of the analog signal interface shown in FIG. 1.
Figure 4:
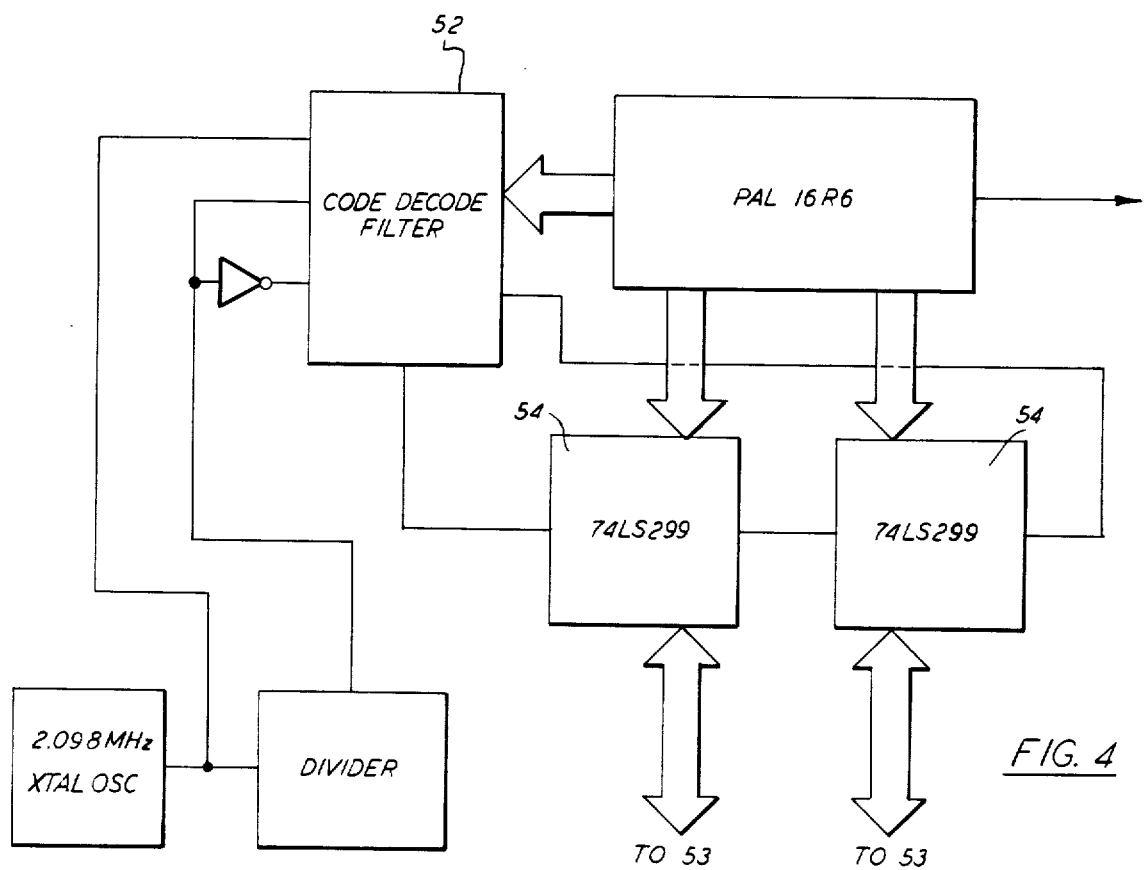
FIG. 4 is a block diagram of one embodiment of the data converter shown in FIG. 2.

In the preferred embodiment, the analog signal interface means 20 includes a programmable code/decode filter 52, preferably an AM7901A device manufactured and marketed by Advanced Micro Devices of Sunnyvale, CA. In the present embodiment, the code/decode filter 52 is used as an inexpensive high resolution voiceband analog-to-digital and digital-to-analog converter. The AM7901A is a digital code/decode filter having integral gain control and chip compensation filters and can be used in either linear code or m-law coding for the digital inputs and outputs. In the linear code mode, the code/decode filter 52 functions as a high resolution analog-to-digital and digital-to-analog converter. The code/decode filter 52 interfaces to the data bus 53 of the digital signal processor 16 data bus by means of a universal serial-to-parallel converter. This particular interface, as shown in FIG. 4, additionally interfaces with a pair of 8-bit bidirectional universal shift/storage registers 54, for example, 74LS299 marketed and manufactured by Texas Instruments of Dallas, Tex. and used for both input and output interfaces to the bus 53. In addition, an interface controller, made with a PAL16R6, marketed and manufactured by MMI (Monolithic Memories Inc., Santa Clara, CA), serves to interface the code/decode filter 52 with the universal shift/storage registers 54, generating all required signals therefor. The analog signal interface means 20 further includes, as shown in FIG. 2, a DTMF transmit and receive interface 56 that encodes and decodes DTMF signals used on most non-dial type telephones. This transmit/receive interface 56 is controlled by the onboard microprocessor 14 and, in one application, can be used for automatic dialing by receiving signals from the onboard microprocessor 14 and delivering those signals to a telephone line interface 44.

The telephone line interface 44 is of a conventional type and provides the audio interface to the telephone lines. Preferably, the interface means 44 is implemented by means of a TEA1059 chip, marketed and manufactured by ITT Semiconductors, and includes a relay controlled by the onboard microprocessor 14 whereby the interface 44 appears to the attached telephone line 42 as either on-hook or off-hook. In addition, the analog signal interface means 20 includes an audio preamplifier 58 for use with a microphone 60 whereby audio signals can be introduced to the programmable Codec filter 52. In addition, an audio amplifier 62 is provided which receives outputs from the programmable Codec filter 52 and drive a speaker mechanism 63.

In the preferred embodiment, a ring detection circuit 64 is provided in the analog signal interface means 20 and is connected across the ring and tip lines, 66 and 68, respectively, of the telephone line interface 44.

Figure 3:
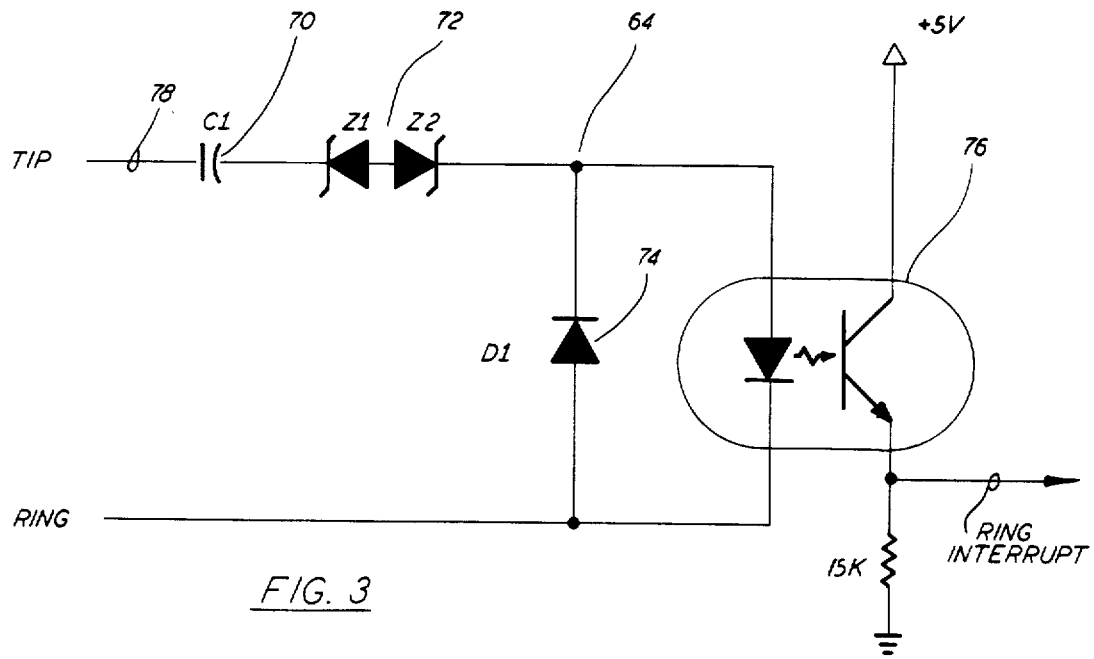
FIG. 3 is one embodiment of the ring detect circuit shown in FIG. 2.

Referring now to FIG. 3, one preferred ring detection circuit 64 embodying the principles of the present invention is shown. The circuit 64 includes a capacitor 70, preferably 0.1 micro Farad in series with the tip line 68 and two 5-volt back-to-back Zener/diodes 72 in series therewith. A second diode 74 is shunted between the tip wire 66, after the diodes 72 and ring wire 68. In addition, a conventional optical switch 76 is connected in parallel with the diode 74 and, in the preferred embodiment, is a model No. T1L113 marketed and manufactured by Texas Instruments of Dallas, Tex. In this ring detect circuit 64 the capacitor 70 effectively acts as a d.c. block and, simultaneously, as a load for the ring pulse. The Zener diodes 72 function as a filter and prevents voice/audio signals from creating a ringing interrupt. The shunt diode 74 is provided to protect the optocoupler 76 from reverse breakdown. When ringing is present, the optocoupler 76 is turned on and an interrupt signal is emitted to the onboard microprocessor 14. This circuit 64 provides isolation between the telephone line and the remainder of the circuitry thereby avoiding interference with conventional telephone communication. In addition, the present ring detect circuit 64 is adapted to detect the hook switch status of the local telephone connected thereto. More specifically, when the local telephone is on-hook (or absent), a hook flash, that is, a switching of the phone line interface relay off and on produces a ringing interrupt to the onboard microprocessor 14. If, however, the local telephone is off-hook, no such interrupt is generated during hook flash.

As more fully discussed below with respect to FIG. 7, a plurality of switches 50 are included in the analog signal interface means 20 that are controlled by the onboard microprocessor 14. The switches 50, depending upon the various positions thereof, provide a plurality of options between the analog signal interface means 20 and the onboard microprocessor 14 and, thus, to the user of the card 10.

Figure 5:
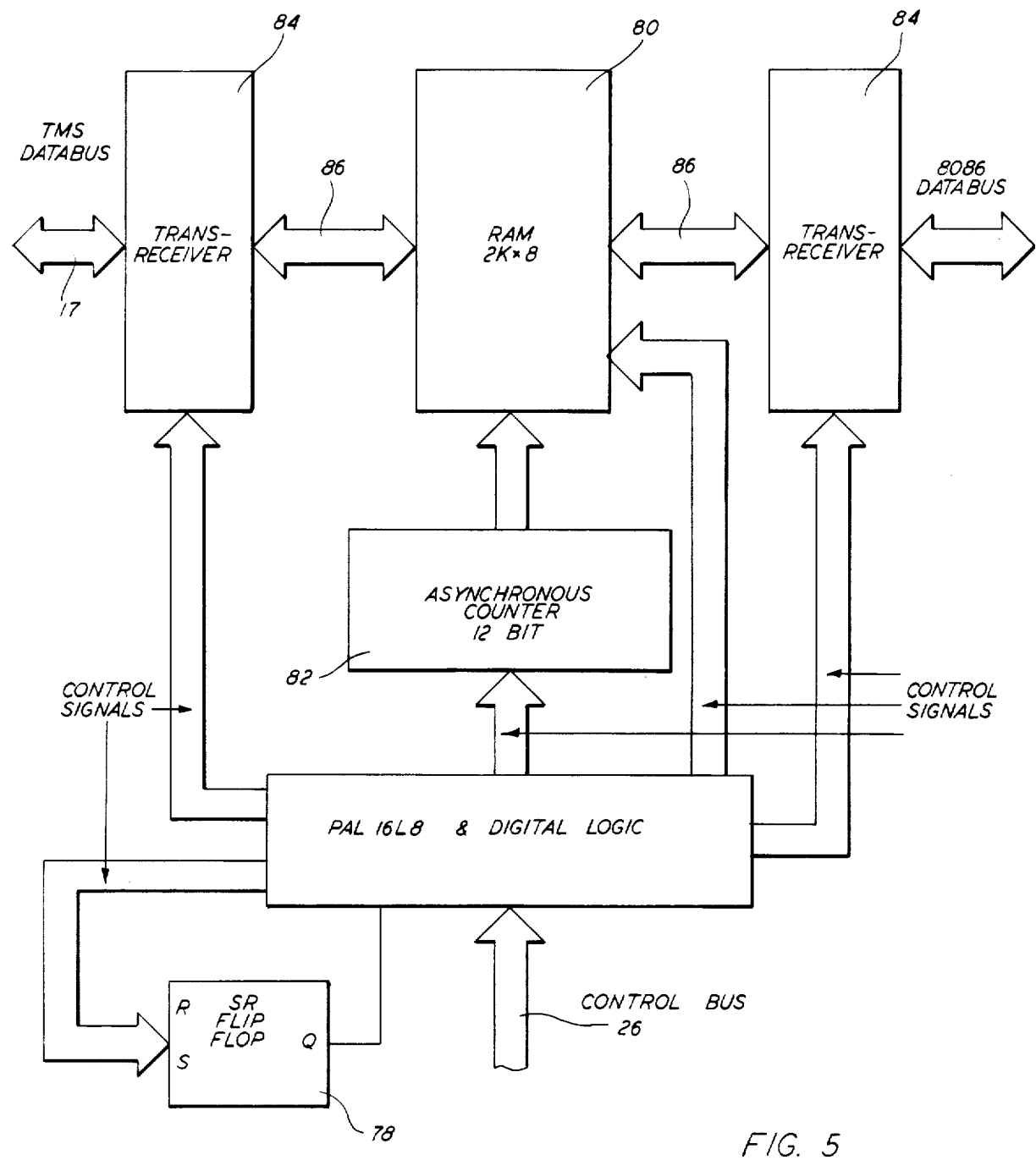
FIG. 5 is a block diagram of one embodiment of the switched memory shown in FIG. 1.

Referring to FIG. 5, the switched memory 18 includes a S-R flip-flop 78 that latches to one of the processors, 14 or 16, and, thus, effects access and control of the switched memory 18. The PAL 16L8 generates all necessary control signals and interfaces to both processors, 14 and 16. In the preferred embodiment, the switched memory 18 includes a 2K byte RAM 80 addressed by a 12 bit asynchronous counter 82 (the HEF4040B which is manufactured and marketed by Signetics of Sunnyvale, CA). In addition, two transceivers 84 provide an internal switch memory data bus 86 to a processor bus 88 within the memory 18. The switched memory 18 appears identical to both the onboard microprocessor 14 and the digital signal processor 16 when in control thereof. That is, either processor, 14 or 16, can read or write to the memory 18. In operation, each read or write statement increments the count in the counter and, hence, moves the address to the next location in the RAM. This address is reset to zero by each processor, 14 or 16, when assuming control of the memory 18. Control of the switched memory 18 is passed to the other processor by accessing a particular port thereof.

In the preferred embodiment, the digital signal processor 16, shown in detail in FIG. 6, includes RAM 36 and PROM 38 memories, having decoding mechanisms performed in programmable logic arrays. The RAM 36 and PROM 38 memories are adapted to permit switching therebetween under the control of the onboard microprocessor 14. As a consequence, a relatively small addressing capability, i.e., the 4K words of the digital signal processor 16, is available for multiple purposes, such as bootstrap loading and other application programs. In addition, all application programs, if desired, can be RAM based and, as a result, the digital signal processor 16 can then be used as a signal processor for speech recognition, speech synthesis, speech analysis, or the like. Further, any new application developed is easily implemented by only introducing a new software program without reconfiguring the discrete circuit components of the card 10.

Figure 7:
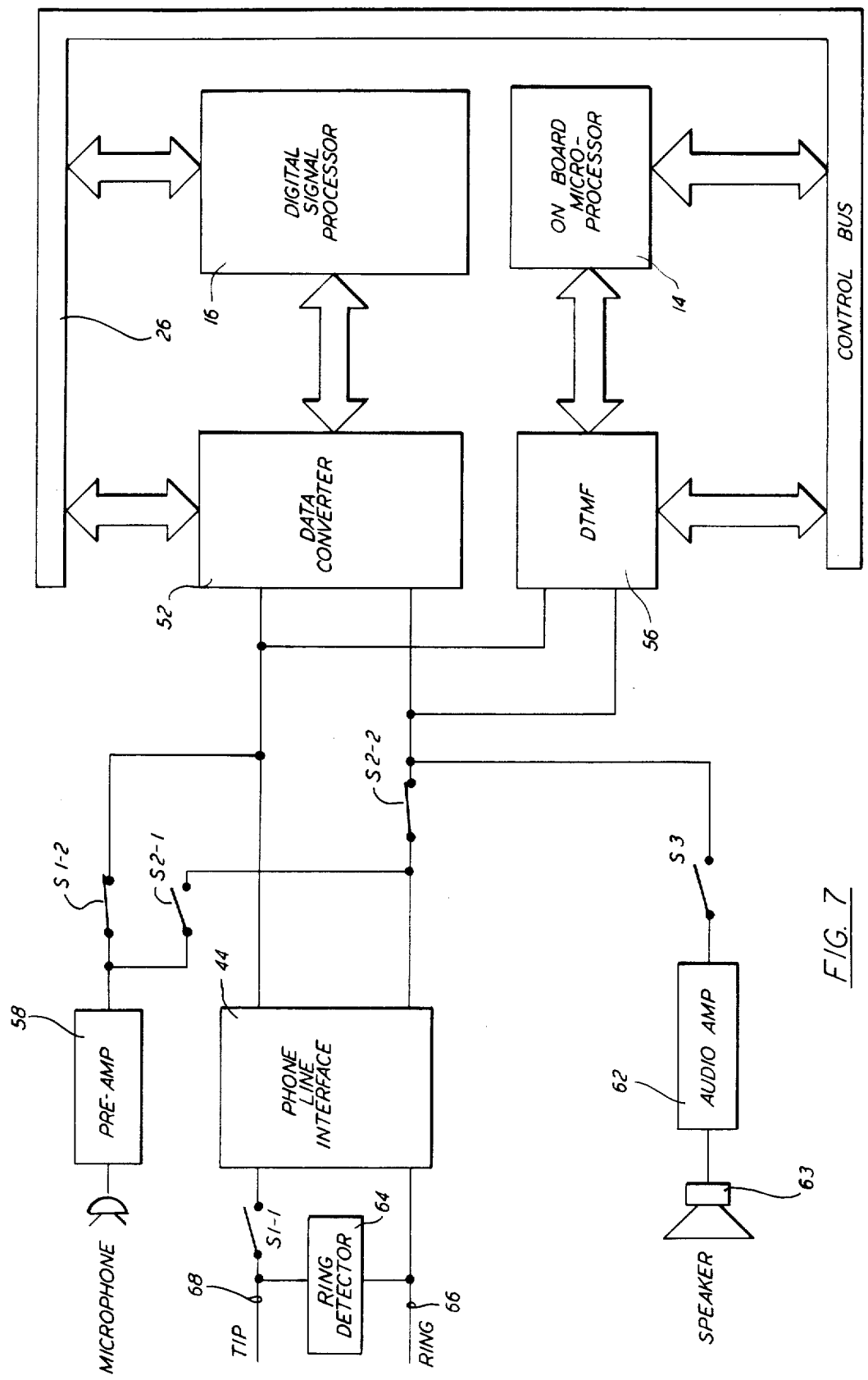
FIG. 7 is a more detailed diagram depicting an arrangement for providing a plurality of options on the card shown in FIG. 1.

A specific embodiment, shown in FIG. 7, wherein, for clarity, all components shown therein have the same numeral designations as in the other Figures, is operative to provide multiple options. Prior to discussing specific switch positions in the embodiment shown in FIG. 7 for exemplary applications, it should be noted that Switch 1 consists of two switches S1-1 and S1-2 coupled together and Switch 2 is, effectively, double pole/single throw type switch under the control of the onboard microprocessor 14 whereas Switch 3 is a single pole single throw type switch. The following is a table designating exemplary applications achievable and the corresponding switch positions therefor. As set forth in the table below, the following applications are clearly immediately available.

| OPTION | S1 | | S2 | | |
|---|---|---|---|---|---|
|  | S1-1 | S1-2 | S2-1 | S2-2 | S3 |
| 1. Invisible Keyboard | Off | On | Off | On | Off |
| 2. Voice Command Over Telephone Line | On | Off | Off | On | Off/On |
| 3. Voice Store and Forward Over Telephone | On | Off | Off | On | Off |
| 4. Voice Record and Playback | Off | On | Off | On | On |
| 5. Hands-Free Telephone | On | Off | On | Off | On |

1. Invisible Keyboard—This application is also conventionally referred to as voice computer command. In such an application, a computer, regardless of the size thereof, is directed to perform tasks by a spoken word rather than requiring an operator key inputting the specific directions.

2. Telephone Command—An extension of the above-discussed voice command allows the telephone line to be connectd directly to the computer, the computer can then be commanded via a telephone. This is accomplished by voice commands rather than the use of the keypressing of various digits to generate DTMF signals for control of the computer.

3. Voice Store and Forward—By use of the digital signal processor 16, voice signals are stored and forwarded remotely over a conventional telephone line.

4. Voice Record and Playback—This option allows a user to locally record a message in digital form and, subsequently, play that same message back at any given time, either to himself or anyone else interconnected with the same computer.

5. Hands-Free Telephone—As implied by the name, a hands-free telephone option allows the caller to carry on a telephone conversation without using hands to hold the handset. In this mode a microphone is connected directly to the phone line and signals coming for the phone interface go to the speaker via the code/-decode filter and digital signal processor.

In actual operation, the present multiple option card 10 is both simple and versatile. Advantageously, in order to use the card 10, the application program, easily provided on a floppy disk, for a particular option and containing instructions for the mother board processor within the computer to download to the onboard microprocessor 14 and the digital signal processor 16. The code for the mother board processor is loaded and run, thus introducing the floppy disk information into the host computer, the onboard microprocessor 14 is reset and instructed to run from its ROM based memory. The ROM based memory, i.e. the specific instructions, for the onboard microprocessor 14 are then loaded into the memory thereof via the computer bus interface 12. The program is run by the onboard microprocessor 14 and, if necessary, such as the case for speech recognition, the digital signal processor 16 is downloaded therefrom. To accomplish this, the onboard PROM 38 of the digital signal processor 16 is activated by the portion of the program stored in the onboard microprocessor 14.

The program in the onboard microprocessor 14 then loads the switched memory 18 with the information necessary for the digital signal processor 16 to run that particular application program and switches the switched memory 18 over to the control of the digital signal processor 16. The program in the PROM 38 of the digital signal processor 16 then waits for control of the switched memory 18 and; when control is transferred thereto, locates the necessary application program codes to transfers, or reads, that code into the RAM 36 memory thereof. Upon completion of the transfer of instructions, the digital signal processor 16 returns control of the switched memory 18 to the onboard microprocessor 14. This sequence is repeated until the digital signal processor 16 receives all necessary instructions for the selected option program. Thereupon, the onboard microprocessor 14 resets the digital signal processor 16 to operate according to the program now stored in the RAM 36.

The above described card 10 clearly is advantageous in that it is easily implemented on a single printed circuit board and by providing both the onboard microprocessor 14 and the digital signal processor 16 with their own RAM memories, application programs may be introduced by merely changing the software program on a floppy disk. Hence, no hardware changes are required for new or different options.

What is claimed is:

1. A multiple option computer card, said card comprising:
   an onboard microprocessor having, as an integral part thereof, a dynamic RAM portion with an associated controller therefor, a ROM portion and an interrupt controller, said onboard microprocessor being controlled via an interface to a computer;
   a digital signal processor connected to said onboard microprocessor and programed thereby; and
   means for accepting analog signals, said analog signal acceptance means having a plurality of switch means and interfacing with said onboard microprocessor and said digital signal processor.

2. The multiple option computer card as claimed in claim 1, wherein said plurality of switch means are controlled by said onboard microprocessor.

3. A multiple option computer card, said card comprising:
   an onboard microprocessor having, as an integral part thereof, a dynamic RAM portion with an associated controller therefor, a ROM portion and an interrupt controller, said onboard microprocessor being controlled via an interface to a computer;
   a digital signal processor connected to said onboard microprocessor and programmed thereby;
   means for accepting analog signals, said analog signal acceptance means having a plurality of switch means and interfacing with said onboard microprocessor and said digital signal processor; and
   a switched memory including means for selectively coupling said switched memory to one of said onboard microprocessor and said digital signal processor, said means for selectively coupling being controlled by said onboard microprocessor.

4. The multiple option computer card as claimed in claim 3, wherein said switched memory further comprises:
   a random access memory; and
   said means for selectively coupling includes a first bus interfacing between said random access memory and said onboard microprocessor;
   a second bus interfacing between said random access memory and said digital signal processor; and
   means for selectively latching said random access memory exclusively to either said first bus or said second bus.

5. The multiple option computer card as claimed in claim 3 wherein said digital signal processor includes:
   a programmable read only memory; and
   a random access memory, said random access memory exchanging information with said onboard microprocessor via said switched memory selectively coupled to one of said microprocessor and processor.

6. The multiple option computer card as claimed in claim 3, wherein;
   said analog signal accepting means includes an analog-to-digital and digital-to-analog converter.

7. The multiple option computer card as claimed in claim 6, wherein;
   said converter includes a programmable code/decode filter.

8. The multiple option computer card as claimed in claim 7, wherein;
   said programmable filter is operated in a linear coding mode.

9. The multiple option computer card as claimed in claim 6 further comprising;
   a dual tone multiple frequency transmit/receive interface.

10. The multiple option computer card as claimed in claim 6 further comprising;
    means for monitoring a telephone line.

11. The multiple option computer card as claimed in claim 10, wherein said means for monitoring comprises:
    a ring detection circuit.

12. The multiple option computer card as claimed in claim 11, wherein said ring detection circuit includes;
    a loading capacitor in series with the tip line of said telephone line and a pair of back-to-back Zener diodes serially connected with said capacitor;
    a shunt diode connected across the ring line and the tip line distal of said Zener diodes; and
    an optoelectric coupler connected in parallel across said shunt diode.

13. The multiple option computer card as claimed in claim 6, wherein said means for accepting analog signals further comprises:
    an audio amplifier for driving a speaker; and
    a preamplifier adapted to amplify a speech signal introduced from a microphone.

14. The multiple option computer card as claimed in claim 12, wherein said plurality of switch means include:
    a first switch means between a telephone line circuit and a telephone line interface;
    a second switch means between a preamplifier and a programmable code/decode filter;
    a third switch means positioned between said telephone line interface and said programmable code/decode filter;
    a fourth switch means between said preamplifier and said third switch means; and
    a fifth switch means positioned between an audio amplifier and said programmable code/decode filter.

15. The multiple option computer card as claimed in claim 14, wherein said first and second switch means are mutually exclusive and wherein said third and fourth switch means are mutually switchable.

16. The multiple option computer card as claimed in claim 14 wherein said first switch means for monitoring the use of said telephone line by means of the signal from said optoelectric coupler of said ring detection circuit.

17. A multiple option speech recognition and management board for use with a host computer, said board comprising:
    means for receiving analog speech signals from a plurality of ports;
    means connected to said receiving means for digitizing and filtering said speech signals;
    an onboard microprocessor;
    means, connected to said digitizing and filtering means and under the control of said onboard microprocessor, for processing said digitized speech signals, whereby spectral features are extracted therefrom; and
    means for receiving and transmitting dual tone multiple frequency signals, said means being interconnected between a telephone line circuit and said onboard microprocessor.

18. A multiple option speech recognition and management board as claimed in claim 17, further comprising:
a common communication path between said onboard microprocessor, said digital processing means and said analog speech signal receiving means.

19. A multiple option speech recognition and management board as claimed in claim 18, additionally comprising:
means for interfacing said common communication path with said host computer, whereby a program in said host computer may be downloaded into said onboard microprocessor according to a programmed read only memory within said onboard microprocessor.

20. A multiple option speech recognition and management board as claimed in claim 18 further comprising:
a switched memory under the control of said onboard microprocessor, said switched memory being selectively connected to one of said onboard microprocessor and said digitized speech signal processing means.

21. A multiple option computer card, said card comprising:
an onboard microprocessor having, as an integral part thereof, a dynamic RAM portion with an associated controller therefor, a ROM portion and an interrupt controller, said onboard microprocessor being controlled via an interface to a computer;
a digital signal processor connected to said onboard microprocessor and programmed thereby, said digital signal processor including a programmable read only memory and a random access memory;
means for accepting analog signals, said analog signal acceptance means having a plurality of switch means and interfacing with said onboard microprocessor and said digital signal processor; and
a switched memory including means for selectively coupling said switched memory to one of said onboard microprocessor and said digital signal processor, said means for selectively coupling being controlled by said onboard microprocessor, said random access memory exchanging information with said onboard microprocessor via said switched memory selectively coupled to one of said microprocessor and processor.

22. A multiple option speech recognition and management board for use with a host computer, said board comprising:
means for receiving analog speech signals from a plurality of ports;
means connected to said receiving means for digitizing and filtering said speech signals;
an onboard microprocessor;
means, connected to said digitizing and filtering means and under the control of said onboard microprocessor, for processing said digitized speech signals, whereby spectral features are extracted therefrom;
means for receiving and transmitting dual tone multiple frequency signals, said means being interconnected between a telephone line circuit and said onboard microprocessor;
a common communication path between said onboard microprocessor, said digital processing means and said analog speech signal receiving means; and
means for interfacing said common communication path with said host computer, whereby a program in said host computer may be downloaded into said onboard microprocessor according to a programmed read only memory within said onboard microprocessor.

23. A multiple option speech recognition and management board for use with a host computer, said board comprising:
means for receiving analog speech signals from a plurality of ports;
means connected to said receiving means for digitizing and filtering said speech signals;
an onboard microprocessor;
means, connected to said digitizing and filtering means and under the control of said onboard microprocessor, for processing said digitized speech signals, whereby spectral features are extracted therefrom;
means for receiving and transmitting duel tone multiple frequency signals, said means being interconnected between a telephone line circuit and said onboard microprocessor;
a common communication path between said onboard microprocessor, said digital processing means and said analog speech signal receiving means; and
a switched memory under the control of said onboard microprocessor, said switched memory being selectively connected to one of said onboard microprocessor and said digitized speech signal processing means.

* * * * *